US006246066B1

(12) United States Patent
Yuehu

(10) Patent No.: US 6,246,066 B1
(45) Date of Patent: Jun. 12, 2001

(54) MAGNETIC FIELD GENERATOR AND CHARGED PARTICLE BEAM IRRADIATOR

(75) Inventor: Pu Yuehu, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/154,752

(22) Filed: Sep. 17, 1998

(30) Foreign Application Priority Data

Dec. 25, 1997 (JP) .................................................. 9-358131
Apr. 2, 1998 (JP) ................................................ 10-089906

(51) Int. Cl.[7] ............................ B01D 59/44; H01J 49/00
(52) U.S. Cl. ............................... 250/492.3; 250/396 ML; 250/374; 250/309
(58) Field of Search ............................ 378/136; 250/374, 250/492.3, 493.3, 493.1, 396 R, 309, 499, 292.3

(56) References Cited

U.S. PATENT DOCUMENTS 6,034,377 * 3/2000 Pu .................................... 250/492.3

* cited by examiner

*Primary Examiner*—Jack Berman
*Assistant Examiner*—Johnnie L Smith, II
(74) *Attorney, Agent, or Firm*—Leydig, Voit & Mayer, Ltd.

(57) ABSTRACT

A magnetic field generator includes a movable magnetic pole pair within a stationary return yoke, modifying a magnetic field at a high speed with high precision. The magnetic field generator includes a first return yoke having a first internal volume, a magnetic pole pair with magnetic poles disposed opposite each other, disposed in the first internal volume, and movable relative to the first return yoke, and a driver for moving the magnetic pole pair within the first internal volume.

19 Claims, 9 Drawing Sheets

MAGNETIC FIELD GENERATOR AND CHARGED PARTICLE BEAM IRRADIATOR

BACKGROUND OF THE INVENTION

1. Field of the Invention

The present invention relates to a magnetic field generator and to a charged particle beam irradiator and, more particularly, to a magnetic field generator for forming a magnetic field by moving a magnetic pair couple in a volume inside a return yoke, and to a charged particle beam irradiator for deflection control of a charged particle beam utilizing a magnetic field formed by the magnetic field generator.

2. Description of the Related Art

A charged particle beam irradiator according to the prior art was disclosed at pages 2055 to 2122, Number 8, Volume 64, 1993, *Review of Scientific Instruments*, by W. T. Chu, et al. FIG. 1 is a schematic perspective view for explaining an example of the charged particle beam irradiator according to the prior art. A charged particle beam generator 35 generates a charged particle beam and, for example, an accelerator is employed as the charged particle beam generator. A charged particle beam transporter 37 transports the charged particle beam generated by the accelerator 35. For example, a transporter having an electromagnet is employed as the charged particle transporter to transport the charged particle beam generated by the accelerator 35. A charged particle beam deflector 39 deflects the charged particle beam 33 transported by the charged particle beam transporter 37. The charged particle beam deflector 39 may be an electromagnet.

A magnetic field generator 10 generates a magnetic field. The charged particle beam 33 passes through the magnetic field generated by the magnetic field generator. Magnetic poles 3*a* and 3*b* form a magnetic pole pair in which the magnetic pole 3*a* and the magnetic pole 3*b* are opposite each other.

A coil 1*a* mis wound around the magnetic pole 3*a*, and a coil 1*b* is wound around the magnetic pole 3*b*. The coils 1*a* and 1*b* are connected to a power source (not illustrated), and, by supplying a current from the power source, a magnetic field is formed between the magnetic pole 3*a* and the magnetic pole 3*b*. A return yoke 5 is disposed outside the magnetic pole pair 3*a* and 3*b*, and the return yoke 5 and the magnetic poles 3*a* and 3*b* are one solid unit.

The magnetic field generator 10 is fixed to a toothed gear 21. A toothed gear 22 engages the toothed gear 21. A driver 11, for example, a motor, rotationally drives the toothed gear 22. By driving the motor 11, the toothed gear 22 is rotated, so the toothed gear 21 and the magnetic field generator 10 are also rotated.

The charged particle beam deflector 39 deflects the charged particle beam 33 to move along a rotation axis 29 of the toothed gear 21. The charged particle beam 33 travels along the rotation axis of the toothed gear 21 and enters the magnetic field generator 10.

A magnetic field corresponding to the current flow in the coils 1*a* and 1*b* is generated between the magnetic poles 3*a* and 3*b*, and a force (Lorentz force) is applied to the charged particle beam passing between the magnetic poles 3*a* and 3*b*. This force corresponds to the vector product of the magnetic field and the charged particle velocity. Accordingly, after passing through the magnetic field generator 10, the direction of the charged particle beam is changed (i.e., deflected).

An irradiated object 15 receives the charged particle beam. When the charged particle beam irradiator is applied to a medical treatment appliance, the irradiated object 15 is a human body.

When the charged particle beam is not deflected by the magnetic field generator 10, the irradiation location of the charged particle beam 33 corresponds to the position where the rotational axis of the toothed gear 21 intersects the irradiated object 15. On the other hand, when deflected by the magnetic field generator 10, the irradiated location moves to a position on a straight line along a direction perpendicular to the magnetic field generated between the magnetic poles 3*a* and 3*b*. The direction of that movement varies, corresponding to the direction of the current flowing in the coils 1*a* and 1*b*, and the magnitude of that movement varies, corresponding to the magnitude of the current flowing in the coils 1*a* and 1*b*. By controlling the current flowing in the coils 1*a* and 1*b*, the irradiated position may be oscillated along a straight line (such an operation is hereinafter referred to as scanning irradiation).

Further, by rotating the toothed gear 21, the straight line rotates around the rotation axis 29 of the toothed gear 21, so the direction of scanning irradiation also rotates. Therefore, the entire region within a circle 19 on the irradiated object 15 is irradiated by the charged particle beam. The radius of the circle can be changed by varying the magnitude of the current flowing through the coils 1*a* and 1*b*.

The charged particle beam irradiator according to the prior art has several problems. Since the magnetic pole 3*a*, the magnetic pole 3*b*, and the return yoke 5 are a solid unit in the magnetic field generator, to change the direction of scanning irradiation, all of the magnetic pole 3*a*, the magnetic pole 3*b*, and the return yoke 5 must be entirely rotated. However, in using the charged particle beam irradiator as a medical treatment appliance for treating a deep tumor, for example, it is necessary to irradiate the tumor with a heavy charged particle beam, such as a proton beam, a carbon beam, etc., having a high energy (250 MeV–400 MeV per nucleon). In that case, the total weight of the magnetic field generator 10 amounts to several tons.

Accordingly, in the construction according to the prior art, in rotating the magnetic pole pair comprising the magnetic poles 3*a* and 3*b*, it is necessary to rotate the return yoke 5 at the same time, together with the magnetic pole pair, which means that a load on the motor 11 is very large. Further, since a large torque motor 11 is required, it is difficult to rotate the magnetic pole pair at a high speed with high precision. Therefore, it takes a very long time to irradiate all of the area within the circle 19.

SUMMARY OF THE INVENTION

An object of the present invention is to provide a magnetic field generator, using a motor with a small torque and varying a magnetic field at a high speed with high precision, and a charged particle beam irradiator, shortening irradiation time at a region and using the magnetic field generator.

A magnetic field generator according to the invention comprises a first return yoke having a first internal volume; a magnetic pole pair comprising a pair of magnetic poles disposed opposite each other, disposed in the first internal volume, and movable relative to said first return yoke; and a driver for moving said magnetic pole pair within the first internal volume.

A charged particle beam irradiator according to the invention comprises a charged particle beam generator for generating a charged particle beam; and a magnetic field generator for deflecting the charged particle beam to adjust a position on an irradiated object irradiated by the charged particle beam, wherein said magnetic field generator includes a first return yoke having a first internal volume; a magnetic pole pair comprising a pair of magnetic poles disposed opposite each other, in the first internal volume, and movable relative to said first return yoke; and a driver for moving said magnetic pole pair within the first internal volume.

A charged particle beam irradiator according to the invention includes a charged particle beam generator for generating a charged particle beam, and a magnetic field generator for deflecting the charged particle beam to adjust a position on an irradiated object irradiated by the charged particle beam, herein said magnetic field generator comprises a first magnetic field generator for deflecting the charged particle beam, and a second magnetic field generator for deflecting the charged particle beam deflected by the first magnetic field generator, the first magnetic field generator comprising a first return yoke having a first internal volume and a first magnetic pole pair comprising a pair of magnetic poles disposed opposite each other, disposed in the first internal volume, and movable relative to said first return yoke.

Other objects and features of the invention will become understood from the following description and reference to the accompanying drawings.

BRIEF DESCRIPTION OF THE DRAWINGS

FIGS. 9*a* and 9*b* are schematic views for explaining a relationship between incident angle of the charged particle beam and radiation of the skin of a patient in which FIG. 9*a* shows the path of the charged particle beam deflected by a single magnetic field generator and FIG. 9*b* shows the path of the charged particle beam deflected by two magnetic field generators.

DETAILED DESCRIPTION OF THE PREFERRED EMBODIMENTS

First Embodiment

Figure 1:
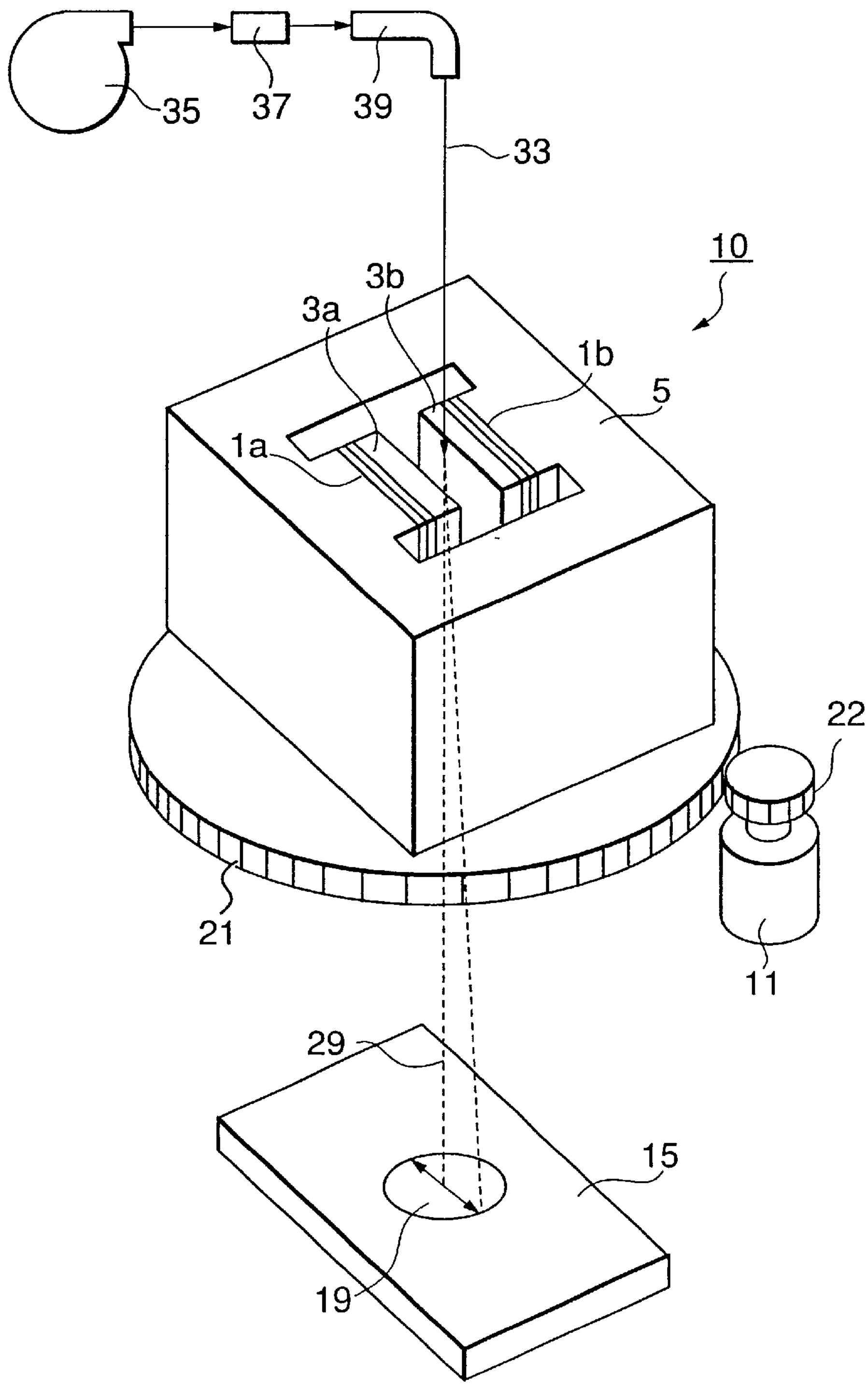
PRIOR ART FIG.1
FIG. 1 is a perspective view showing schematically a construction of a charged particle beam irradiator according to the prior art.
Figure 2:
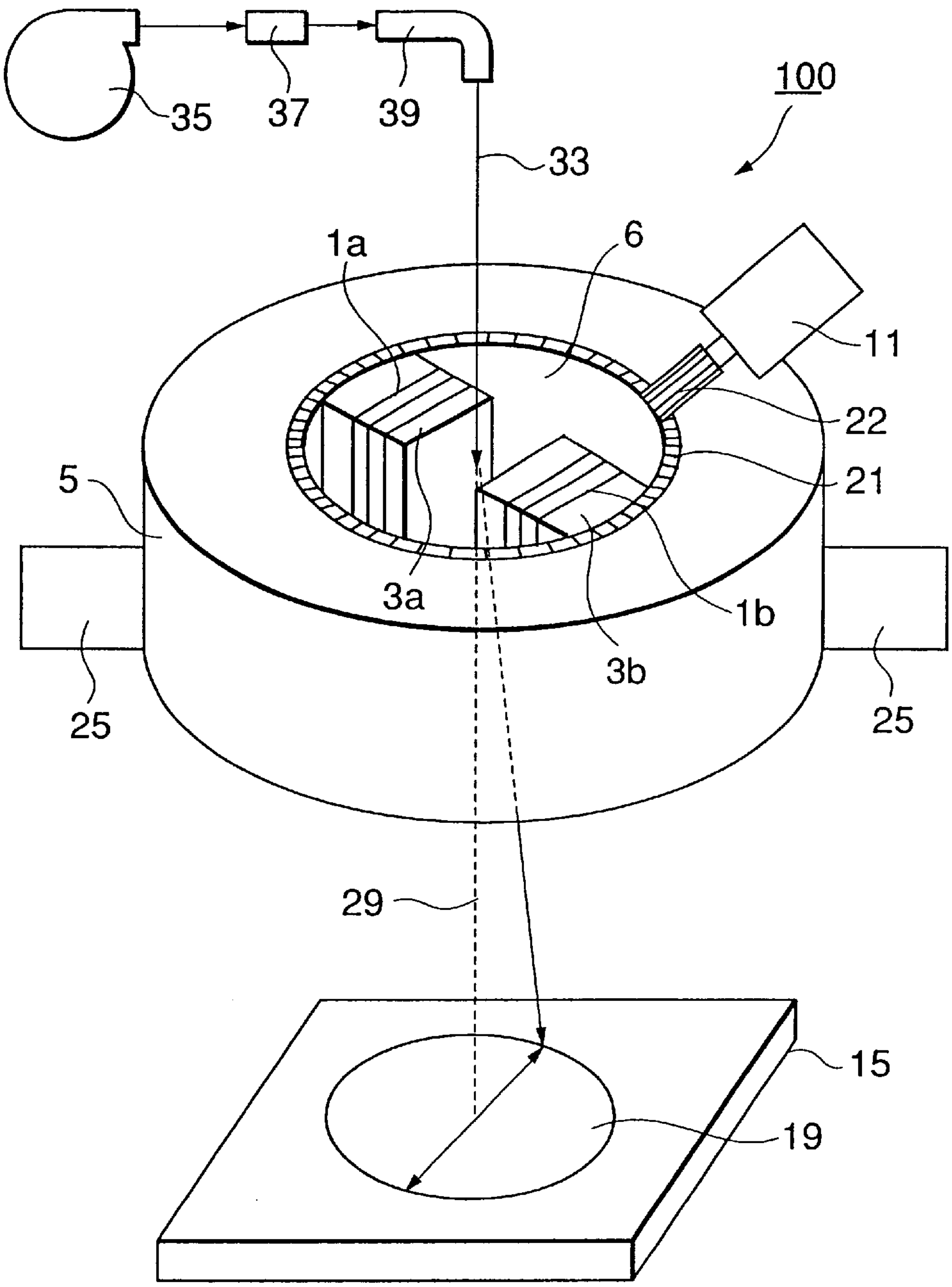
FIG. 2 is a perspective view showing schematically a construction of a charged particle beam irradiator according to a first embodiment of the present invention.
Figure 3:
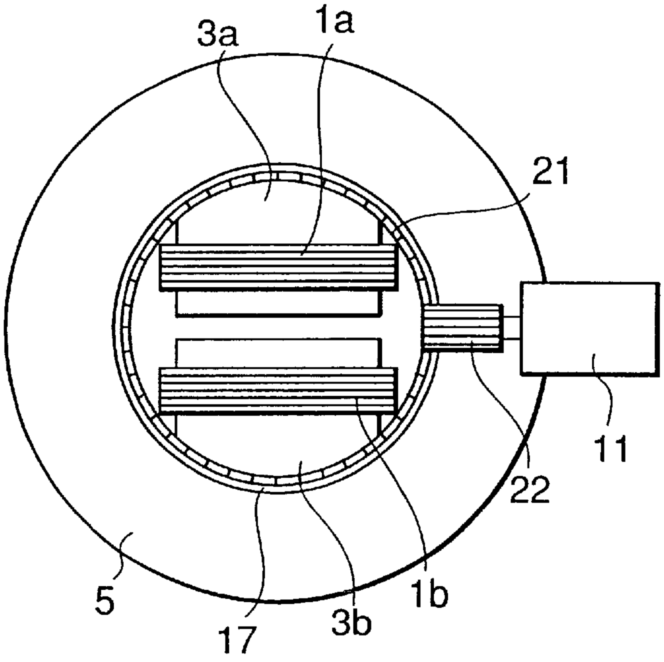
FIG. 3 is a view of the magnetic field generator shown in FIG. 2 taken perpendicular to the path of a charged particle deflected by the charged particle deflector.

FIG. 2 is a perspective view showing schematically a charged particle beam irradiator according to a first embodiment of the present invention, and FIG. 3 is a view of the magnetic field generator shown in FIG. 2, taken perpendicular to the path of a charged particle deflected by the charged particle deflector. In the drawings, like reference numerals designate the same parts as in the prior art irradiator of FIG. 1.

In the drawings, a magnetic field generator 100 generates a magnetic field volume, and a charged particle beam 33 passes through the magnetic field volume generated by the magnetic field generator 100. A magnetic pole pair 3*a* and 3*b* includes a coil 1*a* wound around the magnetic pole 3*a* and coil 1*b* wound around the magnetic pole 3*b*. The coils 1*a* and 1*b* are connected to a power source (not illustrated), and a magnetic field is generated between the magnetic pole 3*a* and the magnetic pole 3*b* by the current flowing through them from the power source.

A first return yoke 5 has a central cylindrical internal volume. This volume corresponds to the first volume. The cylindrical first return yoke 5 also has a cylindrical external shape.

A second return yoke 6 is disposed in the internal volume of the return yoke 5 and has a cylindrical external shape and internal volume. The second return yoke 6 is tubular and its thickness is significantly smaller than the thickness of the first return yoke 5. The external diameter of the second return yoke 6 is a little smaller than the internal diameter of the first return yoke 5, leaving a gap 17 between the second return yoke 6 and the first return yoke 5 (see FIG. 3). The magnetic poles 3*a* and 3*b* are opposedly fixed to the internal surface of the second return yoke 6. To prevent a dislocation with respect to the first return yoke 5 (in particular, a dislocation in the path of the charged particle beam), an upper part and a lower part of the second return yoke 6 include a stopper (not illustrated).

Teeth are disposed on an upper end part edge of the second return yoke 6 as a first toothed gear 21. A second toothed gear 22 mounted on the rotary shaft of the motor 11 engages the first toothed gear 21. By driving the motor 11, the second toothed gear 22 is rotated so that the second return yoke 6 rotates around the rotation axis 29, along the internal surface of the first return yoke 5. The magnetic pole pair 3*a* and 3*b* also rotates around the rotation axis 29. The central axes of the first return yoke 5 and the second return yoke 6 are coincident. A mounting member 25 holds the first return yoke 5 in a fixed position so the magnetic pole pair 3*a* and 3*b* move within the volume inside the first return yoke 5, rotating around the rotation axis 29 relative to the first return yoke 5.

In the magnetic field generator 100, the first return yoke 5 is very heavy (several tons, for example) but is fixed in its mounting and the magnetic pole pair 3*a* and 3*b* is fixed to the second return yoke 6. The total weight of the rotating members, including the magnetic pole 3*a*, the magnetic pole 3*b*, and the second return yoke 6, is about 100 kgs. Accordingly, when the magnetic pole pair 3*a* and 3*b* is rotated around the rotation axis 29, the load applied to the motor 11 is small, so the magnetic pole pair 3*a* and 3*b* can be rotated at high speed with high precision. Therefore, in a charged particle beam irradiator using the magnetic field generator 100, the time required to irradiate an entire area (a circular region, for example) is shortened. Since the load on the motor 11 is reduced, the torque of the motor 11 can be reduced, and the motor 11 can be small, resulting in a reduction in cost.

In rotating the magnetic pole pair 3*a* and 3*b*, the interaction between the charged particle beam and the magnetic field generated by the magnetic pole pair 3*a* and 3*b* is a load on the motor 11. By rotating the magnetic pole pair 3*a* and 3*b* after reducing the current flowing through the coils 1*a* and 1*b*, and by increasing the current flowing in the coils 1*a* and 1*b* after stopping rotation of the magnetic pole pair 3*a* and 3*b*, the load on the motor 11 can be reduced even more. Further, by stopping the current flow from the power source to the coils 1*a* and 1*b* when driving the motor 11, the magnetic field formed by the magnetic pole pair 3*a* and 3*b* weakens or disappears, reducing the load on the motor 11.

Although the volume inside the first return yoke 5 is cylindrical in shape in this embodiment, the same advantages can be achieved if a section of a track on which the magnetic pole pair 3*a* and 3*b* rotationally moves is almost circular and the charged particle beam can pass through the magnetic field volume. Thus, the internal volume is not limited to a cylindrical shape. Although the external shape of the first return yoke is cylindrical in this embodiment, any other shape can be adopted. For example, if the external shape of the first return yoke 5 is a polygonal prism with a cylindrical through hole from the bottom side to the upper side (like a polygonal nut), the contact area between the fixing member 25 and the first return yoke 5 can be increased and the first return yoke 5 can be connected to the fixing member 25 more firmly.

Rotation of the magnetic pole pair 3*a* and 3*b* is described in this embodiment. By providing a sufficient length along the rotation axis 29 of the first return yoke 5, the magnetic pole pair 3*a* and 3*b* can be moved parallel to the rotation axis 29 within the first return yoke 5. As a result, it is possible to vary the position parallel to the path of the charged particle beam where the magnetic field is located. Although the second return yoke 6 is rotated by means of the gears 21 and 22 and the motor 11, any other construction may be employed provided the second return yoke 6 can be rotated along the internal surface of the first return yoke 5.

Second Embodiment

Figure 4:
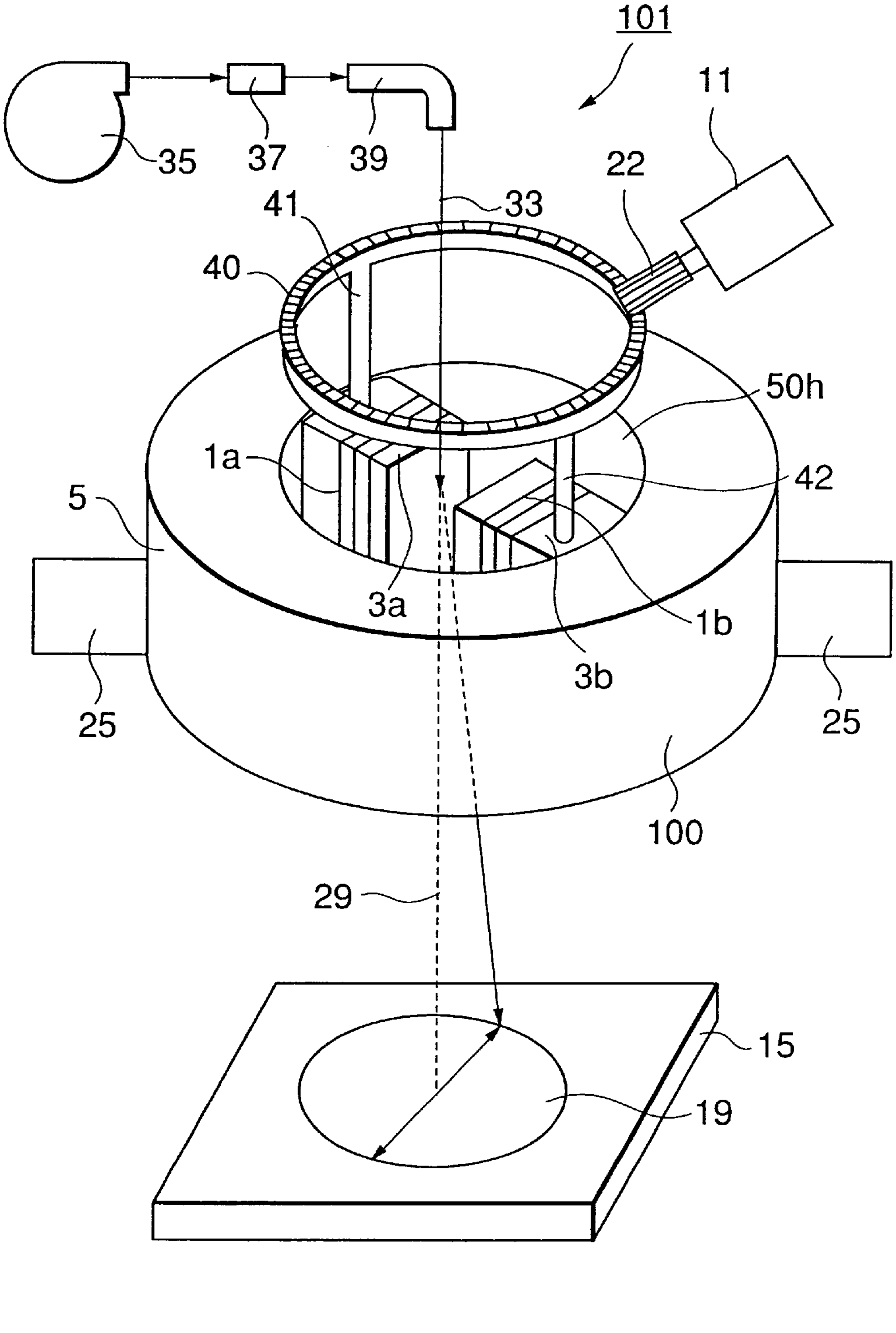
FIG. 4 is a perspective view showing schematically a construction of a charged particle beam irradiator according to a second embodiment of the invention.

FIG. 4 is a perspective view showing schematically a construction of a charged particle beam irradiator according to a second embodiment of the invention. Like reference numerals designate the same parts as in FIGS. 2 and 3.

An annular toothed gear 40 is located outside the first return yoke 5. The annular toothed gear 40 has an internal diameter large enough not to inhibit the passage of the charged particle beam. Teeth on the upper surface of the annular gear 40 engage a second toothed gear 22 on the rotary shaft of the motor 11 for rotating around the rotation axis 29. Connecting and supporting members 41 and 42 connect the magnetic pole pair 3*a* and 3*b* to the annular toothed gear 40 and support the magnetic pole pair 3*a* and 3*b* in the internal volume of the first return yoke 5. In response to the rotation of the toothed gear 22, the annular toothed gear 40 moves rotationally around the rotation axis 29, and the magnetic pole pair 3*a* and 3*b* also moves rotationally around the rotation axis 29, relative to the first return yoke 5, along the internal surface of the first return yoke 5, and inside the first return yoke 5.

In this embodiment, the second return yoke 6 of the first embodiment is not necessary, so the rotating members can be even lighter in weight. In addition, the invention is not limited to the first and second embodiments; any other construction that permits rotational movement of the magnetic pole pair 3*a* and 3*b* in the volume inside the first return yoke 5 can be employed.

Third Embodiment

Figure 5:
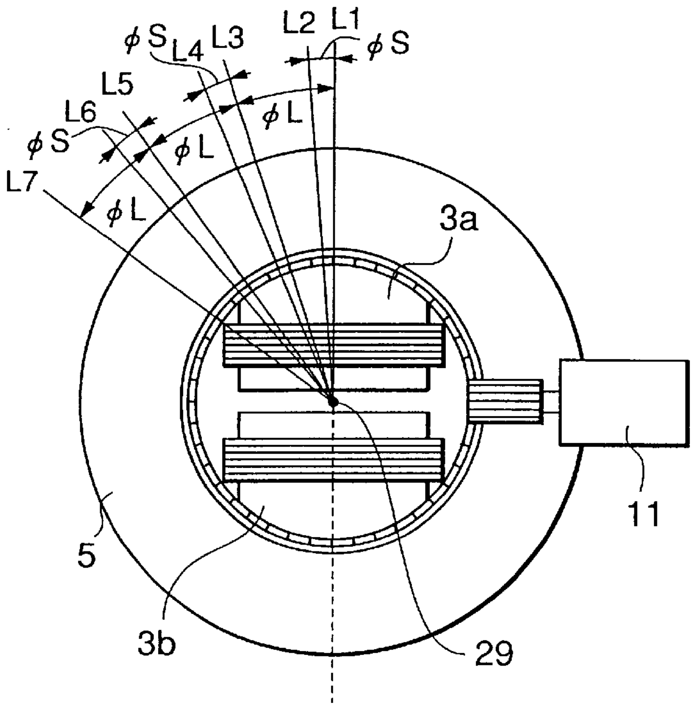
FIG. 5 is an explanatory view showing an example of the rotation of the magnetic field generator according to a third embodiment of the invention taken perpendicular to the path of a charged particle deflected by the charged particle deflector.

FIG. 5 is an explanatory view showing an example of the rotation of the magnetic field generator, taken perpendicular to the path of a charged particle deflected by the charged particle deflector. In the drawing, like reference numerals designate the same parts as in FIGS. 2 to 4.

Positions L1 to L7 are positions where the magnetic pole 3*a* is intended to stop after rotation of the magnetic pole pair 3*a* and 3*b*. An angle $\phi_S$ between L1 and L2, between L3 and L4, and between L5 and L6 is small, and an angle $\phi_L$ between L1 and L3, between L3 and L5, and between L5 and L7 is larger than the angle $\phi_S$.

When the magnetic pole pair 3*a* and 3*b* is rotationally driven, if the angle of one rotational step is small, a braking period for stopping the rotation is short, generally lowering control precision of the rotational drive. As a result, when moving the magnetic pole 3*a* to the positions L1 to L7, in order, control precision is reduced at the positions L2, L4, and L6. To cope with this decreased precision, the magnetic pole pair 3*a* and 3*b* is rotationally drivable in both forward and backward directions. By controlling the rotation of the magnetic pole 3*a* clockwise, i.e., L7→L6→L4→L2, after controlling the rotation counterclockwise, L1→L3→L5→L7, the angle of each rotation can be increased. A desired scan can be achieved in two scanning operations, a forward scan and a backward scan. When the rotation angle to an adjacent stop position is smaller than a threshold rotation angle, by performing a backward scan after rotation to a stop position through a rotation angle larger than the threshold rotation angle, the precision of the rotational drive can be improved.

Although two scanning operations are described in this embodiment, preferably the forward scan and the backward scan can be alternatingly repeated, three times or more. In addition, it is also preferable that the second forward scan be performed after rotating the magnetic pole pair 3*a* and 3*b* fully one turn, instead of backward scanning.

Fourth Embodiment

Figure 6:
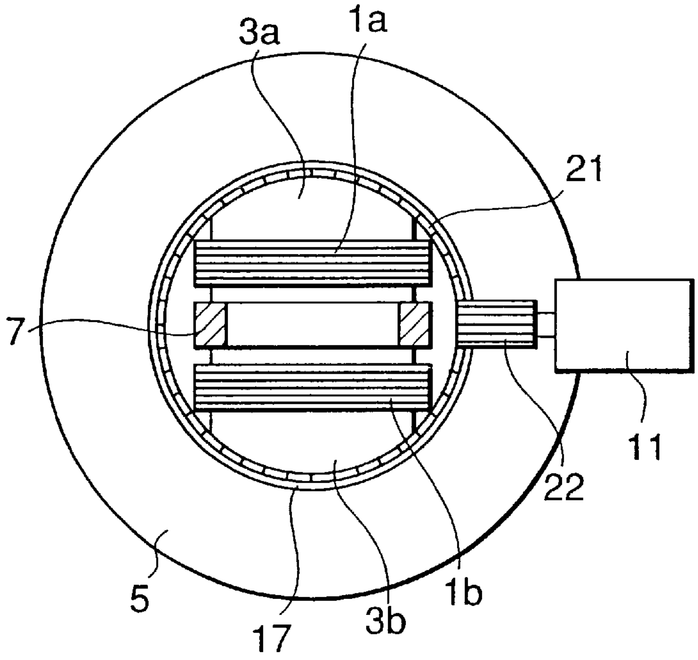
FIG. 6 is a view showing a part of a charged particle beam irradiator according to a fourth embodiment of the invention taken perpendicular to the path of a charged particle deflected by the charged particle deflector.

FIG. 6 is a view showing a part of a charged particle beam irradiator according to a fourth embodiment of the invention, taken perpendicular to the path of a charged particle deflected by the charged particle deflector, in the same manner as FIG. 3. In the drawing, like reference numerals designate the same parts as in FIGS. 2 to 4.

An electromagnetic force supporting member 7 supports an electromagnetic force generated in the gap between the magnetic pole 3*a* and the magnetic pole 3*b*. This electromagnetic force supporting member 7 is a non-magnetic material, such as stainless steel, and located between the magnetic pole 3*a* and the magnetic pole 3*b*. In this embodiment, the ends of the electromagnetic force supporting member 7 are respectively fixed to opposed faces of the magnetic poles 3*a* and 3*b* and connect those magnetic poles to each other.

By providing such a non-magnetic electromagnetic force supporting member 7 and connecting the opposed magnetic poles 3*a* and 3*b* to each other, the magnetic poles 3*a* and 3*b* are not displaced and/or deformed, preventing disturbance of the magnetic field volume between the magnetic pole 3*a* and the magnetic pole 3*b*.

Fifth Embodiment

Figure 7:
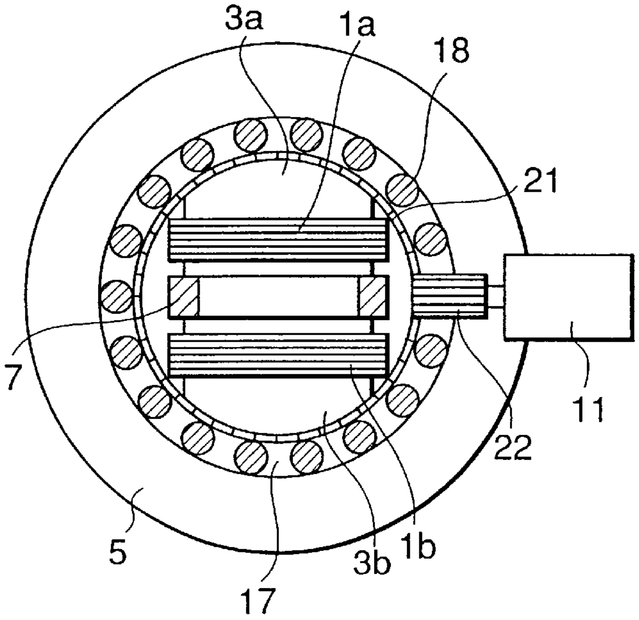
FIG. 7 is a view showing a part of a charged particle beam irradiator according to a fifth embodiment of the invention taken perpendicular to the path of a charged particle deflected by the charged particle deflector.

FIG. 7 is a view showing a part of a charged particle beam irradiator according to a fifth embodiment of the invention, taken perpendicular to the path of a charged particle deflected by the charged particle deflector, in the same manner as FIG. 3. In the drawing, like reference numerals designate the same parts as in FIGS. 2 to 6.

A bearing 18 reduces friction between the first return yoke 5 and the second return yoke 6. By providing the bearing 18, when the second return yoke 6 is rotated along the internal surface of the first return yoke 5, frictional force between the internal surface of the first return yoke 5 and the external surface of the second return yoke 6 is reduced, and the second return yoke 6 rotates smoothly. Accordingly, the second return yoke 6 can be rotated at a high speed with high precision without increasing the torque of the drive motor 11. The time necessary for entirely irradiating a region of the irradiated object 15 with the charged particle beam can be shortened. By employing a magnetic substance or a magnetic fluid as the bearing 18, magnetic resistance between the first return yoke 5 and the magnetic poles 3*a* and 3*b* can be reduced.

Sixth Embodiment

Figure 8:
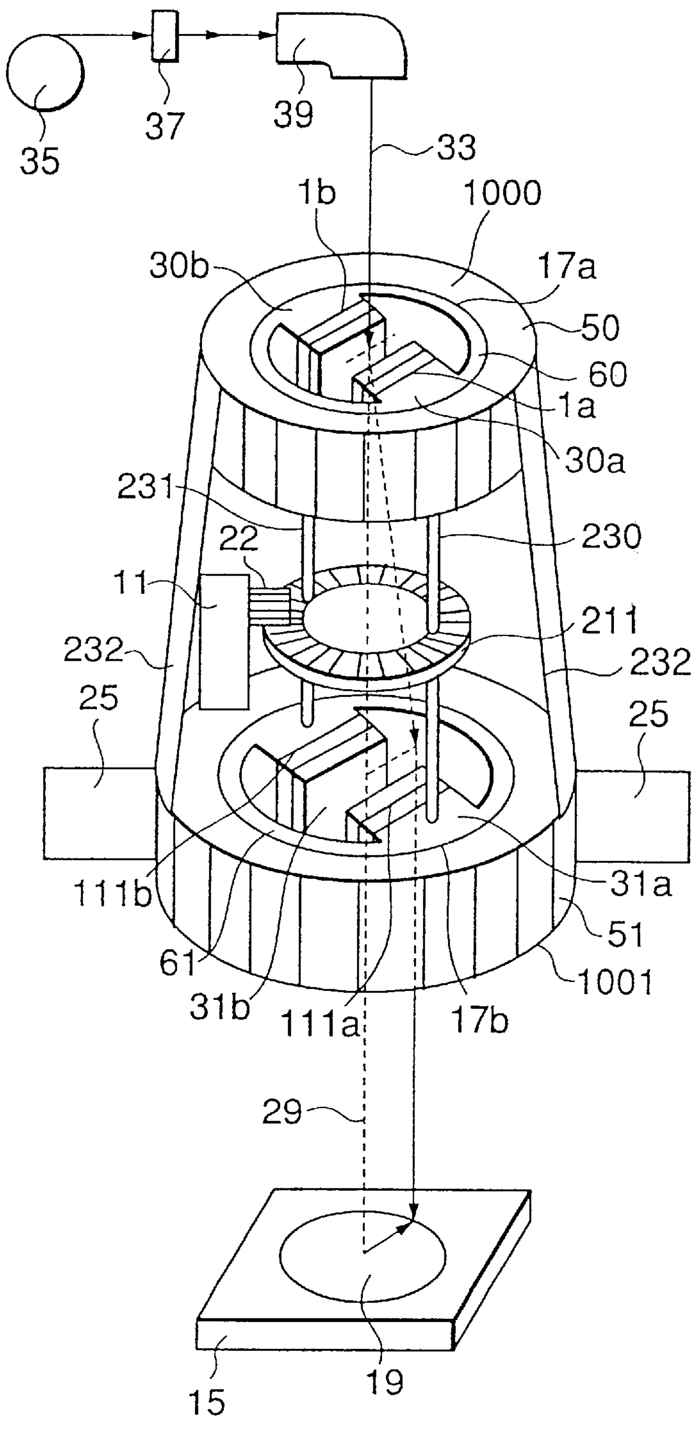
FIG. 8 is a perspective view showing schematically a charged particle beam irradiator according to a sixth embodiment of the invention.

FIG. 8 is a perspective view showing schematically a construction of a charged particle beam irradiator according to a sixth embodiment of the invention. In the drawing, like reference numerals designate the same parts as in FIGS. 2 to 7. In this embodiment, two magnetic field generators 1000 and 1001 are disposed along the path of the charged particle beam, and the directions of deflection of the beam by each of the magnetic field generators are opposite each other.

A first magnetic field generator 1000 comprises first and second return yokes 50 and 60, a magnetic pole 30*a*, a magnetic pole 30*b*, the coil 1*a*, and the coil 1*b*. The coils 1*a* and 1*b* are respectively wound around magnetic poles 30*a* and 30*b* as a first magnetic pole pair. The first and second return yokes 50 and 60 are both tubular, and, since the thickness of the second return yoke 60 is smaller than the thickness the first return yoke 50, the second return yoke 60 is lighter in weight than the first return yoke 50. The second return yoke 60 is located inside the first return yoke 50 and the magnetic poles 30*a* and 30*b* are fixed on the internal surface of the second return yoke 60, opposed to each other. The external diameter of the second return yoke 60 is a little smaller than the internal diameter of the first return yoke 50, leaving a gap 17*a* between the first return yoke 50 and the second return yoke 60.

A second magnetic field generator 1001 comprises third and fourth return yokes 51 and 61, a magnetic pole 31*a*, a magnetic pole 31*b*, a coil 111*a*, and a coil 111*b*. The coils 111*a* and 111*b* are respectively wound around the magnetic poles 31*a* and 31*b* as a second magnetic pole pair. The third and fourth return yokes 51 and 61 are both tubular, and, since the thickness of the fourth return yoke 61 is smaller than the thickness of the third return yoke 51, the fourth return yoke 61 is lighter in weight than the third return yoke 51. The fourth return yoke 61 is located inside the third return yoke 51 and the magnetic poles 31*a* and 31*b* are fixed on the internal surface of the fourth return yoke 61, opposed to each other. The external diameter of the fourth return yoke 61 is a little smaller than the internal diameter of the third return yoke 51, leaving a gap 17*b* between the third return yoke 51 and the fourth return yoke 61.

An annular toothed gear 211 located between the first and third return yokes 50 and 51, and having an internal diameter large enough not to inhibit the passage of the charged particle beam, includes teeth on an upper surface as a first toothed gear. This annular toothed gear 211 engages a second toothed gear 22 mounted on the rotary shaft of the motor 11 for rotation around the rotation axis 29.

Connecting and supporting members 230 and 231 connect the magnetic pole pair 30*a* and 31*a* to the annular toothed gear 211 and support the magnetic pole pairs 30*a*, 30*b*, 31*a*, and 31*b* within the first and third return yokes 50 and 51, respectively.

The relationship between the directions of the magnetic fields generated by the magnetic poles 30*a* and 30*b* and the magnetic pole 31*a* and 31*b* is fixed at all times. An arrangement in which the generated magnetic fields are opposite and parallel to each other is described below.

A connecting and supporting member 232 connects the first return yoke 50 to the third return yoke 51. A fixing member 25 fixes the third return yoke 51, and the position of the first return yoke 50 connected to the third return yoke 51 by the connecting and supporting member 232 is, therefore, also fixed. By driving the motor 11, the toothed gear 22 is rotated, so the annular toothed gear 211 engaging the toothed gear 22 is rotated, whereby the second return yoke 60 with the magnetic poles 30*a* and 30*b*, and the fourth return yoke 61 with the magnetic poles 31*a* and 31*b*, are rotated. Accordingly, the second toothed gear 22, the annular toothed gear 211, and the connecting and supporting members 230 and 231 comprise a connecting and driving section.

Since the first, second, third, and fourth return yokes 50, 60, 51, and 61 are arranged so that their center axes are coincident with the rotation axis 29, the magnetic pole pair 30a and 30b rotates around the rotation axis 29 inside the first return yoke 50, and the magnetic pole pair 31*a* and 31*b* rotates around the rotation axis 29 inside the third return yoke 51. In other words, the magnetic pole pair 30*a* and 30*b* rotates relative to the first return yoke 50, and the magnetic pole pair 31*a* and 31*b* rotates relative to the third return yoke 51. These rotations are interlocking movements.

In this embodiment, the deflection angle of the charged particle beam in the first magnetic field generator 1000 and the deflection angle of the charged particle beam in the second magnetic field generator 1001 are the same angle, but opposite in direction from each other, so that the charged particle beam passing through the magnetic field generator 1001 and the charged particle beam 33 emitted from the charged particle beam deflector 39 are parallel at all times. For example, the thickness of the magnetic poles 30*a* and 30*b* (i.e., the length along the path of the charged particle beam) is the same as the thickness of the magnetic poles 31*a* and 31*b*. The intensity of the magnetic field between the magnetic poles 30*a* and 30*b* is the same as the intensity of the magnetic field between the magnetic poles 31*a* and 31*b*, with the directions of the magnetic fields opposite to each other; that is, by supplying currents to the coil 1*a* and the coil 111*a* in opposite directions and with the same magnitude and by supplying a current to the coil 1*b* and the coil 111*b* in opposite directions and with the same magnitude, the deflection angle of the charged particle beam in the first magnetic field generator 1000 is the same as the deflection angle of the charged particle beam in the second magnetic field generator 1001, but in an opposite direction.

By adjusting the currents flowing in the coils 1*a* and 1*b* and the coils 111*a* and 111*b* in an interlocking manner, even when the charged particle beam 33 is subject to the deflection by the magnetic field generator 1000 and 1001, the direction of the charged particle beam exiting from the magnetic field generator 1001 can be parallel to the direction of the charged particle beam 33 exiting from the charged particle beam deflector 39.

In this construction, when the charged particle beam irradiator is applied to a medical treatment appliance for treating a tumor, it is possible to reduce the exposure (dose)

of the charged particle beam per unit area on the skin surface, so the influence on the skin of the charged particle beam irradiation can be reduced. Further, since the direction of the charged particle beam is fixed at all times, it is easy to calculate the effect of the charged particle beam on the irradiated object.

Figure 9A:
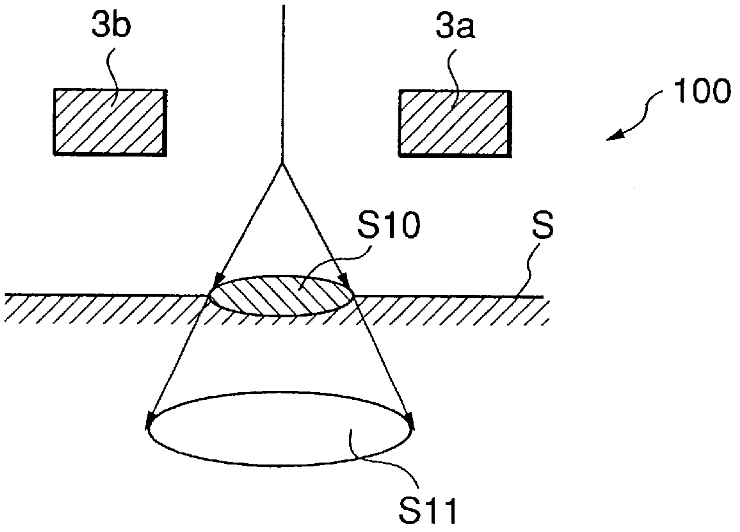
Figure 9B:
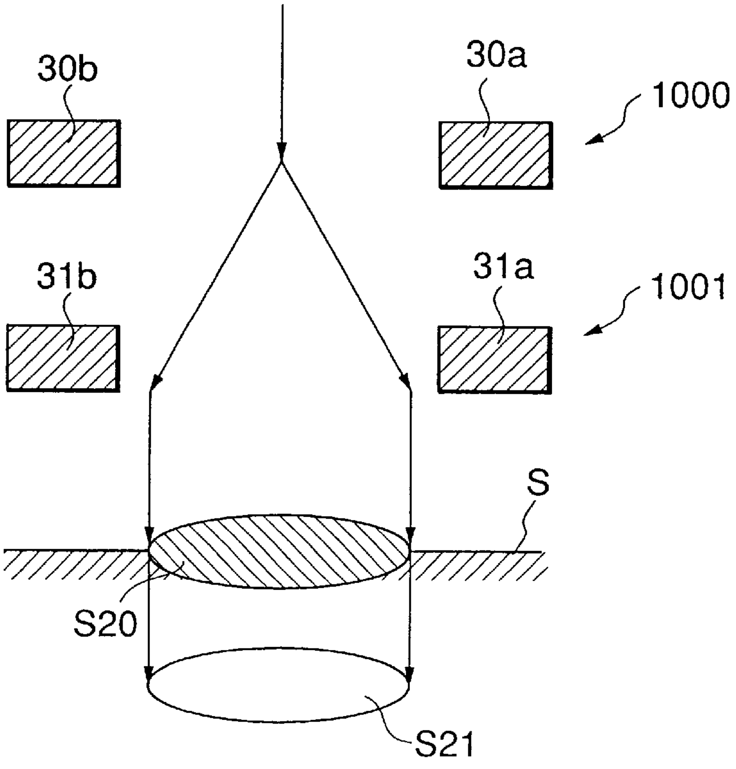

FIGS. 9*a* and 9*b* are schematic views for explaining a relationship between an incident angle of the charged particle beam and radiation exposure of a patient's skin. FIG. 9*a* shows the charged particle beam deflected in a single magnetic field generator.

The skin is irradiated at an incident angle determined by the deflection angle. FIG. 9*b* shows a charged particle beam deflected in two magnetic field generators, so the skin is irradiated by a perpendicular beam at all times.

Supposing that the same area is irradiated with the same density of charged particle beam, the charged particle beam passes through a narrow region S10 on the skin surface S in FIG. 9*a*, while the charged particle beam passes through a wider region S20 in FIG. 9*b*. Everywhere within the skin surface, the density of the exposure quantity is uniform in each case; that is, the density of the charged particle beam on the skin surface S in FIG. 9*b* is smaller than in FIG. 9*a*. As the skin is generally sensitive to the charged particle beam, the influence on the skin can be restrained by reducing the exposure to the charged particle beam per unit area. Therefore, the influence of the beam on the skin in FIG. 9*b* is smaller than in FIG. 9*a*.

Furthermore, in FIG. 9*a*, the density of the charged particle beam is reduced with depth below the skin surface. The density is largest at the skin surface S and smallest in the affected part S11, a final position of the charged particle beam. If the affected region irradiated with the charged particle beam has a width in the depth direction (i.e., increasing distance from the skin surface), the affected region can be irradiated uniformly by scanning in the depth direction. The scanning is achieved by controlling the energy of the charged particles. However, when a portion distant from the skin surface S within the affected region is to be irradiated, energy is lost near the skin surface S within the affected region. Therefore, if the density of the charged particle beam near the skin surface surfaces S is larger than at a position distant from the skin surface S, the exposure near the skin surface S becomes excessively large, and it is difficult to irradiate the affected region uniformly. In other words, when intending to increase the exposure distant from the skin surface S within the affected region, the exposure near the skin surface S within the affected region is still increased, and it is difficult to irradiate evenly an affected region having a width in the depth direction.

On the other hand, in FIG. 9*b*, as the density of the charged particles incident on the skin is almost constant irrespective of the depth below the skin, it is easy to irradiate evenly the affected region having a width in the depth direction. Further, by adjusting current flows in an interlocking manner so that a larger current is supplied to the coil 111*a* than is supplied to the coil 1*a* and that a larger current is supplied to the coil 111*b* than is supplied to the coil 1*b*, the magnetic fields between the magnetic poles 30*a* and 30*b* and between the magnetic poles 31*a* and 31*b* are controlled so that a narrower region is irradiated.

In applying this embodiment to medical equipment for treating a tumor, a tumor under the skin surface may be convergently irradiated with the charged particle beam, so that the irradiation exposure of the skin surface of a patient is reduced.

The power source connected to the coils 1*a* and 1*b* and the power source connected to the coils 111*a* and 111*b* may be either a single power source or separate power sources; that is, any power source can be connected to the coils 1*a* and 1*b* and the coils 111*a* and 111*b* provided the current supplied to the coils 1*a* and 1*b* and the current supplied to the coils 111*a* and 111*b* can be adjusted in an interlocking manner.

Seventh Embodiment

Figure 10:
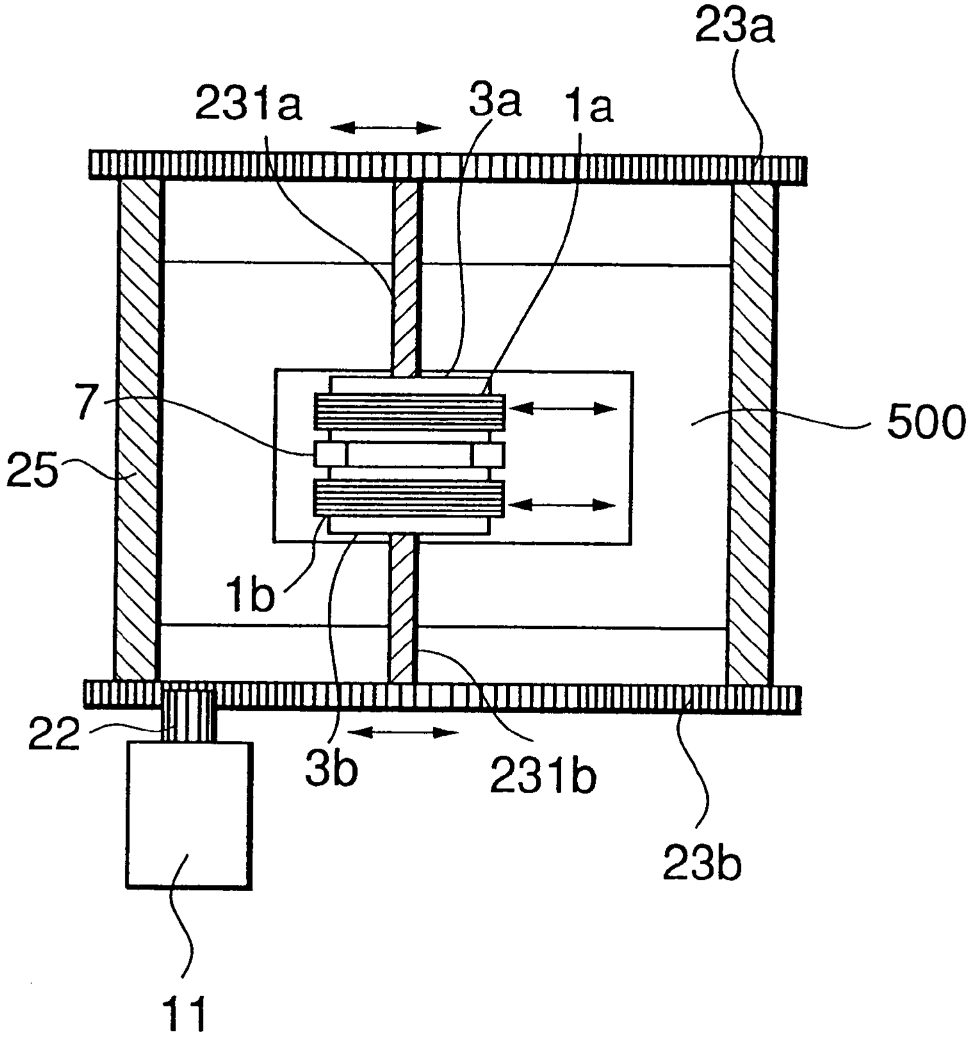
FIG. 10 is a view showing a part of a charged particle beam irradiator according to a seventh embodiment of the invention taken along the path of a charged particle deflected by the charged particle deflector.

FIG. 10 is a view showing a part of a charged particle beam irradiator according to a seventh embodiment of the invention, taken perpendicular to the path of a charged particle deflected by the charged particle deflector, in the same manner as FIG. 3. In the drawing, like reference numerals designate the same parts as in FIGS. 2 to 8.

A first return yoke 500 has a rectangular prism-shaped internal first volume. A fixing member 25 provides a mount for fixedly holding the first return yoke 500.

Driving frames 23*a* and 23*b* include teeth on an upper surface that engage the toothed gear 22 and can be moved reciprocatingly by driving the motor 11. A connecting and supporting member 231*a* connects the magnetic pole 3*a* to the driving frame 23*a*. A connecting and supporting member 231*b* connects the magnetic pole 3*b* to the driving frame 23*b*. An electromagnetic force supporting member 7 is disposed between the magnetic poles 3*a* and 3*b*.

By the rotation of the toothed gear 22, the driving frames 23*a* and 23*b* move in parallel, and the magnetic poles 3*a* and 3*b* move on a straight line. In the magnetic field generator shown in FIG. 10, the first space of the first return yoke 500 is a rectangle, elongated horizontally in the drawing, and, by moving the driving frames 23*a* and 23*b* horizontally and in parallel, the magnetic pole pair 3*a* and 3*b* is moved almost perpendicular (the horizontal direction in the drawing) to both the magnetic field (vertical direction in the drawing) and the charged particle beam (perpendicular to the drawing).

By employing the described embodiment, even when the incident position of the charged particle beam on the magnetic field generator changes, a desired deflection can be performed with respect to the charged particle beam; that is, even with a small magnetic pole width, a large change of the incident position of the charged particle beam can be accepted. Since the heavy first return yoke 500 is fixed in position and the magnetic pole pair 3*a* and 3*b* is driven in the volume inside the fixed first return yoke 500, the load on the motor 11 can be reduced, and the magnetic pole pair 3*a* and 3*b* can be moved at high speed with high precision.

Although the supporting member 7 is disposed between the magnetic poles 3*a* and 3*b* in this embodiment, instead of providing such a supporting member 7, a toothed gear (not illustrated) engaged with the driving frame 23*a* may be used, with this toothed gear rotated by a driver, such as the motor 11. The same advantages can be achieved in this arrangement, without the supporting member.

Although the rectangular prism-shaped volume is present in the first return yoke 500 in this embodiment, the same advantage can be achieved by a shape in which a part of the volume in the first return yoke 500, i.e., a track on which the magnetic pole pair 3*a* and 3*b* moves linearly, has a pair of parallel sides, and the charged particle beam can pass through the volume. Thus, the shape of the internal volume is not limited to the rectangular prism. Further, any external shape can be satisfactory.

Eighth Embodiment

Figure 11:
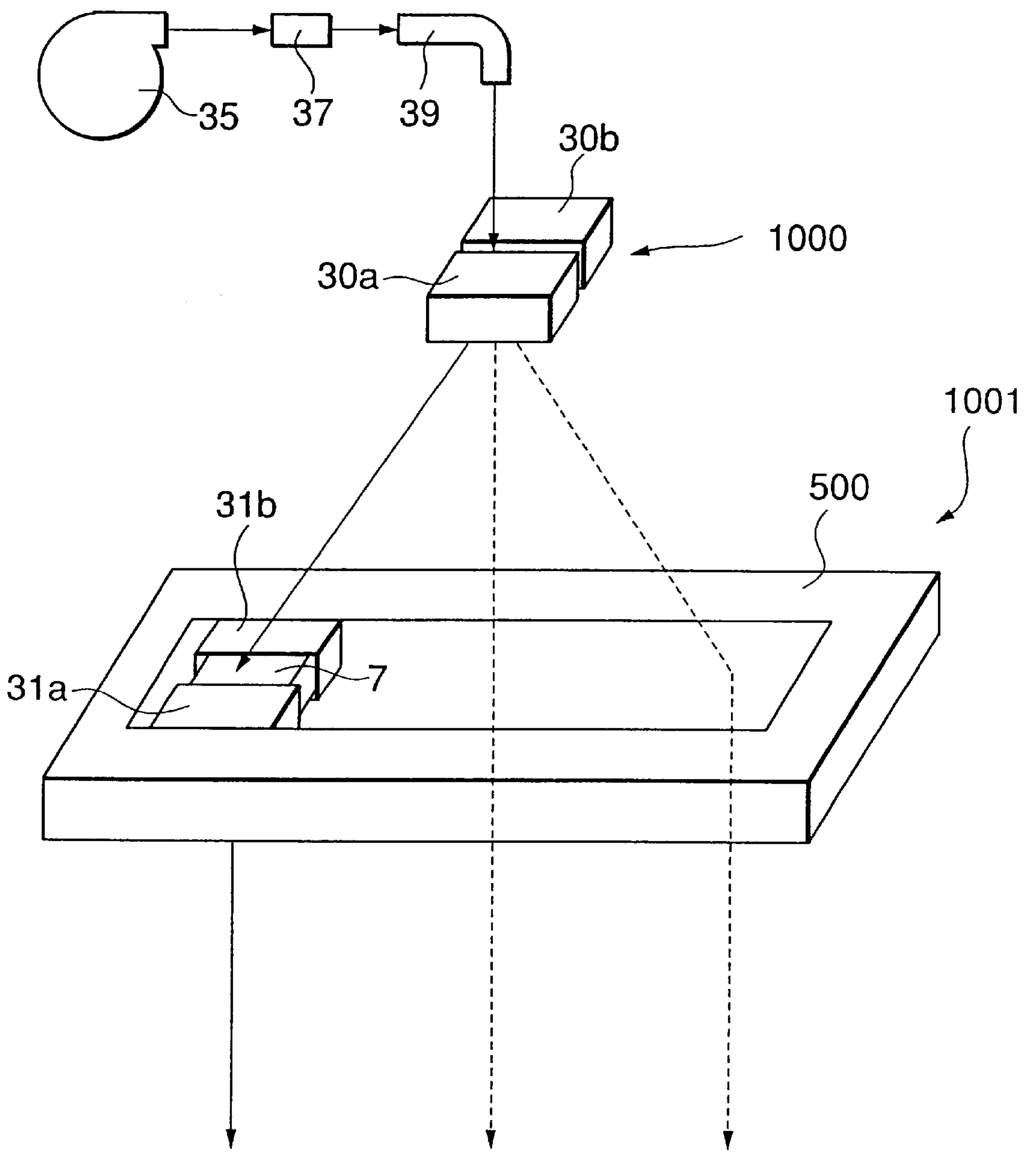
FIG. 11 is a schematic view showing a part of a charged particle beam irradiator according to an eighth embodiment of the invention in which a charged particle beam is deflected by two magnetic field generators, including the magnetic field generator shown in FIG. 10.

FIG. 11 is a schematic view showing a part of a charged particle beam irradiator according to an eighth embodiment of the invention in which a charged particle beam is deflected by two magnetic field generators, including the magnetic field generator shown in FIG. 10. In the drawing, like reference numerals designate to the same parts as in FIGS. 2 to 9. This charged particle beam irradiator comprises a first magnetic field generator 1000 and a second magnetic field generator 1001. The conventional magnetic field generator according to the prior art or any of the magnetic field generators according to embodiments 1 to 5 is utilized as the magnetic field generator 1000, and the magnetic field generator shown in FIG. 10 is utilized as the second generator 1001.

The first magnetic field generator 1000 and the second magnetic field generator 1001 deflect the charged particle beam by equal deflection angles but in opposite directions, in the same manner as in embodiment 6, so that the beam exiting the second magnetic field generator 1001 is almost parallel to the beam incoming to the first magnetic field generator 1000.

In the charged particle beam irradiator shown in FIG. 8, the incidence of the charged particle beam on the second magnetic field generator 1001 changes according to the deflection angle of the first magnetic field generator 1000. Therefore, to deflect the charged particle beam by a desired deflection angle in the second magnetic field generator 1001, it is necessary to determine the magnitude of the current applied to the coil, considering the deflection angle and the incidence position. Further, in the charged particle beam irradiator shown in FIG. 8, the charged particle beam needs to pass through a volume between the magnetic poles 31*a* and 31*b* to be deflected in the second magnetic field generator 1001. Therefore, to prolong the length of scanning or to enlarge the region of scanning, it is necessary to extend the width of the magnetic poles 31*a* and 31*b* in the direction of scanning; that is, the length that can be scanned is limited.

In scanning the charged particle beam using the first magnetic field generator 1000, when the second magnetic field generator 1001 is the one shown in FIG. 10, the magnetic pole pair 31*a* and 31*b* can be moved linearly to correspond to changes in the incident position of the charged particle beam due to the scanning. Thus, the magnitude of the current flowing to the coil of the second magnetic field generator 1001 can be determined according to the deflection angle in the first magnetic field generator 1000, without considering the resultant change in the position of incidence on the second magnetic field generator 1001. Further, without changing the magnitude of the current supplied to the coil, the irradiation time in scanning the irradiated object can be prolonged.

In the same manner as in the sixth embodiment, by rotating the magnetic field generators 1000 and 1001 shown in FIG. 11 around the center of the charged particle beam, it is possible to scan all of a desired irradiation region (a circular region, for example). Concerning the magnetic field generators 1000, by rotating only the magnetic pole pair while keeping the return coil fixed, the load on the drive motor can be reduced.

Although the charged particle beam irradiator has been described supposing a fixed irradiation port, the invention is not so limited. It is preferable that the charged particle beam irradiator be incorporated in a nozzle (not illustrated) of a so-called rotating gantry irradiator for irradiating a tumor in a patient at any optional angle. In this case, the return yokes 50, 51, and 500 are held fixedly by the fixing member 25 and rotate with the charged particle beam deflector 39.

Further, the charged particle beam irradiator described is not limited to medical treatment appliances but can be applied to any other field, such as semiconductor materials, in which irradiation or injection of atoms using a charged particle beam may be required.

What is claimed is:

1. A magnetic field generator comprising:

a first return yoke having a first internal volume;

a magnetic pole pair comprising a pair of magnetic poles disposed opposite each other, disposed in the first internal volume, and movable relative to said first return yoke; and a driver for moving said magnetic pole pair within the first internal volume.

2. The magnetic field generator as defined in claim 1 wherein the first internal volume is substantially circular in cross-section, said magnetic pole pair is rotatable along an internal surface of said first return yoke, and said driver rotationally drives said magnetic pole pair.

3. The magnetic field generator as defined in claim 1 comprising a second return yoke having a second internal volume, disposed in the first internal volume, and rotatable along an internal surface of said first return yoke, wherein said magnetic pole pair is fixed to said second return yoke in the second internal volume, and said driver drives said magnetic pole pair and said second return yoke.

4. The magnetic field generator as defined in claim 3 comprising a bearing of a magnetic substance disposed between said first return yoke and said second return yoke.

5. The magnetic field generator as defined in claim 1 comprising a non-magnetic magnet supporting member connecting opposed faces of each of said magnetic poles in the first internal volume.

6. The magnetic field generator as defined in claim 1 wherein a cross-section of the first internal volume has a pair of parallel sides, said magnetic pole pair is linearly movable along an internal surface of said first return yoke, and said driver linearly drives said magnetic pole pair.

7. The magnetic field generator as defined in claim 1 wherein each magnetic pole comprises a respective coil and comprising a power source for supplying a current to each coil upon stopping of movement of said magnetic pole pair and for reducing the current supplied to each coil upon movement of said magnetic pole pair.

8. The magnetic field generator as defined in claim 1 wherein said driver rotationally drives said magnetic pole pair to rotate through an angle larger than a threshold angle to a stop position of said magnetic pole pair.

9. A charged particle beam irradiator comprising:

a charged particle beam generator for generating a charged particle beam; and a magnetic field generator for deflecting the charged particle beam to adjust a position on an irradiated object irradiated by the charged particle beam, wherein said magnetic field generator comprises:

a first return yoke having a first internal volume;

a magnetic pole pair comprising a pair of magnetic poles disposed opposite each other, disposed in the first internal volume, and movable relative to said first return yoke; and a driver for moving said magnetic pole pair within the first internal volume.

10. The charged particle beam irradiator as defined in claim 9 wherein the first internal volume is substantially circular in cross-section, said magnetic pole pair is rotatable along an internal surface of said first return yoke, and said driver rotationally drives said magnetic pole pair.

11. The charged particle beam irradiator as defined in claim 9 comprising a second return yoke having a second internal volume, disposed in the first internal volume, and rotatable along an internal surface of said first return yoke, wherein said magnetic pole pair is fixed to said second return yoke in the second internal volume, and said driver drives said magnetic pole pair and said second return yoke.

12. The charged particle beam irradiator as defined in claim 11 comprising a bearing of a magnetic substance disposed between said first return yoke and said second return yoke.

13. The charged particle beam irradiator as defined in claim 9 comprising a non-magnetic magnet supporting member connecting opposed faces of each of said magnetic poles in the first internal volume.

14. The charged particle beam irradiator as defined in claim 9 wherein each magnetic pole comprises a respective coil and comprising a power source for supplying a current to each coil upon stopping of movement of said magnetic pole pair and for reducing the current supplied to each coil upon movement of said magnetic pole pair.

15. The charged particle beam irradiator as defined in claim 9 wherein said driver rotationally drives said magnetic pole pair to rotate through an angle larger than a threshold angle to a stop position of said magnetic pole pair.

16. A charged particle beam irradiator comprising:

a charged particle beam generator for generating a charged particle beam, and a magnetic field generator for deflecting the charged particle beam to adjust a position on an irradiated object irradiated by the charged particle beam, wherein said magnetic field generator comprises:

a first magnetic field generator for deflecting the charged particle beam, and a second magnetic field generator for deflecting the charged particle beam deflected by the first magnetic field generator, one of the first and second magnetic field generators comprising a first return yoke having a first internal volume and a first magnetic pole pair comprising a pair of magnetic poles disposed opposite each other, disposed in the first internal volume, and movable relative to said first return yoke.

17. The charged particle beam irradiator as defined in claim 16 wherein another of the first and second magnetic field generators comprises a second return yoke having a second internal volume and a second magnetic pole pair disposed opposite each other, disposed in the second internal volume, and movable relative to said second return yoke.

18. The charged particle beam irradiator as defined in claim 17 wherein:

the first internal volume has a substantially circular cross-section, and the first magnetic pole pair is rotatably disposed along an internal surface of said first return yoke;

said second return yoke internal volume has a substantially circular cross-section, and the second magnetic pole pair is rotatably disposed along an internal surface of said second return yoke; and the charged particle beam irradiator comprises a driver for rotationally moving the first magnetic pole pair and the second magnetic pole pair in an interlocking manner.

19. The charged particle beam irradiator as defined in claim 16 wherein the second magnetic field generator comprising said first return yoke and said first magnetic pole pair, a cross-section of the first internal volume has a pair of parallel sides, the first magnetic pole pair is linearly movable along an internal surface of the first return yoke toward a deflection direction of said first magnetic field generator.

* * * * *